United States Patent
Kim

(10) Patent No.: US 10,261,714 B2
(45) Date of Patent: Apr. 16, 2019

(54) MEMORY CONTROLLER AND MEMORY SYSTEM INCLUDING SAME

(71) Applicant: SAMSUNG ELECTRONICS CO., LTD., Suwon-si, Gyeonggi-do (KR)

(72) Inventor: Shi Hye Kim, Daegu (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/696,940

(22) Filed: Sep. 6, 2017

(65) Prior Publication Data

US 2018/0113641 A1 Apr. 26, 2018

(30) Foreign Application Priority Data

Oct. 24, 2016 (KR) .................. 10-2016-0138239

(51) Int. Cl.
*G06F 13/28* (2006.01)
*G06F 3/06* (2006.01)

(52) U.S. Cl.
CPC .......... *G06F 3/0635* (2013.01); *G06F 3/0611* (2013.01); *G06F 3/0659* (2013.01); *G06F 3/0688* (2013.01); *G06F 13/28* (2013.01)

(58) Field of Classification Search
CPC ............. G06F 12/1027; G06F 12/0831; G06F 12/1081; G06F 12/0897; G06F 13/24
USPC ........................................................ 710/308
See application file for complete search history.

(56) References Cited

U.S. PATENT DOCUMENTS

| | | | |
|---|---|---|---|
| 5,671,391 A | 9/1997 | Knotts | |
| 6,237,064 B1 | 5/2001 | Kumar et al. | |
| 6,308,246 B1 * | 10/2001 | Hagersten | G06F 11/0712 711/133 |
| 6,842,831 B2 | 1/2005 | Wilcox et al. | |
| 7,500,062 B2 | 3/2009 | Beukema et al. | |
| 7,890,699 B2 | 2/2011 | Comparan et al. | |
| 9,298,665 B2 | 3/2016 | Pierson et al. | |
| 2002/0019921 A1 * | 2/2002 | Hagersten | G06F 11/0712 711/205 |
| 2003/0097539 A1 * | 5/2003 | Hagersten | G06F 11/0712 711/203 |
| 2015/0178204 A1 | 6/2015 | Ray et al. | |
| 2016/0026583 A1 | 1/2016 | Shaevver et al. | |
| 2017/0177422 A1 * | 6/2017 | Guthrie | G06F 9/3834 |

* cited by examiner

*Primary Examiner* — Titus Wong
(74) *Attorney, Agent, or Firm* — Volentine, Whitt & Francos, PLLC

(57) ABSTRACT

A memory controller, a memory system and a method of operating the memory controller are disclosed. A memory controller includes a CPU selecting a memory bank, a memory storing a first extended address associated with the selected memory bank, and a memory management unit (MMU) cloning the first extended address and storing the cloned first extended address as a second extended address. The MMU includes snoop logic that stores a first address corresponding to the first extended address, receives a second address from the CPU, compares the first address with the second address, and provides an update signal in response to the comparison of the first address and second address. The MMU also includes a cloning register that updates the second extended address with input data received from the CPU in response to the update signal. The memory and MMU are both directly connected to the CPU via a low latency interface.

20 Claims, 10 Drawing Sheets

MEMORY CONTROLLER AND MEMORY SYSTEM INCLUDING SAME

This U.S. non-provisional application claims priority to Korean Patent Application No. 10-2016-0138239 filed on Oct. 24, 2016, the subject matter of which is hereby incorporated by reference in its entirety.

BACKGROUND

The inventive concept relates generally to memory controllers, memory systems including same, and/or methods of operating a memory controller or memory system. More specifically, the inventive concept relates to memory controllers, flash memory based memory systems and methods of operating same.

Certain contemporary electronic devices incorporate memory resources that may include a 'built-in flash memory' or a 'system on chip' (SoC) device. That is, one or more flash memory cell array(s) and related peripheral circuits may be disposed on a single semiconductor chip to form, wholly or in part, an integrated circuit. The peripheral circuits may variously include a high voltage circuit, a logic circuit for a constituent microcontroller or processor, etc.

In a broad class of devices referred to hereafter as SoC memory systems, there are tradeoffs that usually must be made between size, power consumption, operating speed (or frequency) and data throughput (bandwidth). Generally speaking, greater bandwidth comes at higher unit cost and increased physical size (i.e., reduced component integration density). Accordingly, SoC memory systems will often include memory sub-systems or components providing high bandwidth capabilities (hereafter, "high bandwidth memory") and others providing relatively lower bandwidth capabilities ("low bandwidth memory"). These different SoC memory subsystems or components are operationally distinct, at least in terms of performance, but are often configured in a multi-level scheme to address disparate needs and tradeoffs presented by operation of the constituent SoC memory system.

In this context, a high bandwidth memory will exhibit relatively low data/signal latencies with respect to a central processing unit (CPU). The high bandwidth memory may also be directly accessed by the CPU via a dedicated interface. From a system configuration standpoint, therefore, the high bandwidth memory may be considered a low-level memory. In contrast, a low bandwidth memory is configured to access other SoC memory system components using a system bus protocol. As such the low bandwidth memory may be considered a high-level memory.

Contemporary SoC memory systems demand large data storage capacity, and therefore usually include large capacity data storage devices.

Given these common aspects of a SoC memory system, various operating methods have been proposed to efficiently store and access data. One conventionally understood method in this regard in the so-called 'bank memory extension method'. The bank memory expansion method is a method of mapping interchangeable physical memories to a same address space in order to increase the amount of usable memory. However, when the bank memory extension method is used to control operation of contemporary SoC memory systems certain latency (or delay) problem may adversely effect overall performance. That is, accessing a low bandwidth memory in a Soc memory system using a system bus protocol may introduce added signal delay, thereby degrading performance. For example, in the foregoing configuration it is often necessary to frequently change (or update) an extended address associated with the bank extension of the memory.

SUMMARY

In one aspect, the inventive concept provides a memory controller exhibiting improved operating speed and performance when required to update an extended address in accordance with a bank extension of flash memory using a low-level memory interface having a high bandwidth.

In another aspect, the inventive concept provides a memory system including this type of memory controller and using a corresponding operating method.

In one aspect, the inventive concept provides a memory controller including a central processing unit (CPU) that selects a memory bank from among a plurality of memory banks included in a main memory, a memory directly connected to the CPU via a low latency interface, wherein the memory stores a first extended address associated with the selected memory bank, and a memory management unit (MMU) directly connected to the CPU via a low latency interface, wherein the MMU clones the first extended address and stores the cloned first extended address in a second extended address. The MMU includes; snoop logic that stores a first address corresponding to the first extended address, receives a second address from the CPU, compares the first address with the second address, and provides an update signal in response to the comparison of the first address and second address, and a cloning register that updates address stored in the second extended address with input data received from the CPU in response to the update signal.

In another aspect, the inventive concept provides a memory system including; a main memory including a plurality of memory banks, and a memory controller that controls operation of the main memory. The memory controller includes a central processing unit (CPU) that selects a memory bank from among the plurality of memory banks, a memory directly connected to the CPU via a low latency interface, wherein the memory stores a first extended address associated with the selected memory bank, a memory management unit (MMU) directly connected to the CPU via a low latency interface, wherein the MMU clones the first extended address and stores the cloned first extended address in a second extended address, and a main memory controller that accesses the selected memory bank using an address extracted from the second extended address. In response to the CPU changing the selected memory bank from a first memory bank to a second memory bank different from the first memory bank, the memory updates the first extended address using an address associated with the second memory bank, and the MMU updates address stored in the second extended address using the address for updating the first extended address.

In still another aspect, the inventive concept provides a method of operating a memory controller accessing data stored in a main memory including a plurality of memory banks and including a central processing unit (CPU), a memory connected to the CPU via a low latency interface, and a memory management unit (MMU) directly connected to the CPU via a low latency interface. The method includes; storing in the memory a first address, as first extended address identifying a selected memory bank among the plurality of memory banks, cloning the first extended address in the MMU and storing the cloned first extended address in a second extended address in the MMU, snooping at least one of the first extended address and second extended address upon receiving a second address from the CPU and comparing the first address with the second address, providing an update signal in response to the comparison of the first address and second address in the MMU, and updating address stored in the second extended address in a cloning register of the MMU with input data received from the CPU in response to the update signal.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION

Unless defined otherwise, all technical and scientific terms used herein have the same meaning as commonly understood by one of ordinary skill in the art to which this inventive concept belongs. It is noted that the use of examples, exemplary terms and descriptions provided herein is intended to teach the making and use of the inventive concept. The scope of the inventive concept is not limited to only the written description and illustrated embodiments presented herein.

Hereinafter, certain embodiments of the inventive concept including a memory controller and/or memory system including same will be described in relation to one or more of FIGS. 1 to 9.

Figure 1:
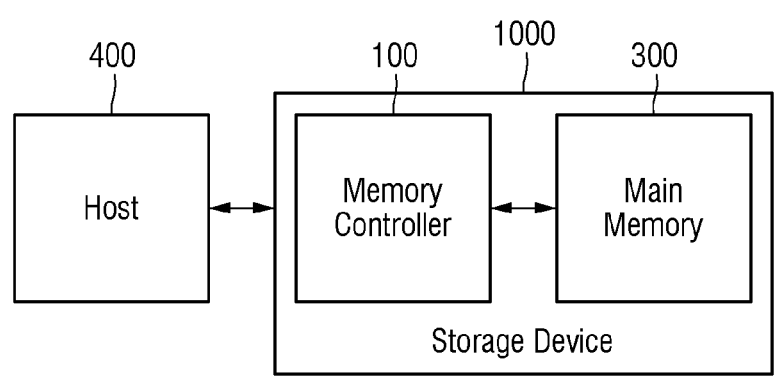
FIG. 1 is a block diagram illustrating a memory system according to some embodiments of the present inventive concept.

FIG. 1 is a block diagram illustrating a memory system according to embodiments of the inventive concept.

Referring to FIG. 1, the memory system generally comprises a host 400 and a storage device 1000. The storage device 1000 comprises a memory controller 100 and a main memory 300, where various configurations may be realized using a single chip, multiple interconnected chips, modules and/or devices. For example, the memory controller 100 and main memory 300 may be implemented as a single storage device 1000 connected to a separate host 400. Alternately, the host 400, memory controller 100 and/or main memory 300 may be integrated in a single device.

The host 400 will issue various data access requests to the memory controller 100 in response (e.g.) to the execution of an application or file system. Data access requests may include read requests, write requests, erase request, etc., that result in the definition and execution of corresponding operations directed to the main memory 300 under the control of the memory controller 100.

Those skilled in the art will recognize that the main memory 300 may be variously configured. For example, the memory cells of a memory cell array may be arranged in a multiplicity of strings, rows, columns and/or banks. Here, it is assumed that the main memory 300 includes a plurality of memory banks, recognizing that as the number of memory banks included in the main memory 300 increases, so too does the data storage capacity of the main memory 300.

It is further assumed for purposes of this description that each memory bank included in the main memory 300 uses a same addressing scheme controlled by the memory controller 100 in such a manner that a memory bank to be accessed may be dynamically changed. This approach is one type of bank memory extension method. And in this context, as the memory controller 100 controls the operation of the main memory 300, the memory controller 100 determines whether to access a particular memory bank among the plurality of memory banks included in the main memory 300. Further explanation of this exemplary approach follows.

Figure 2:
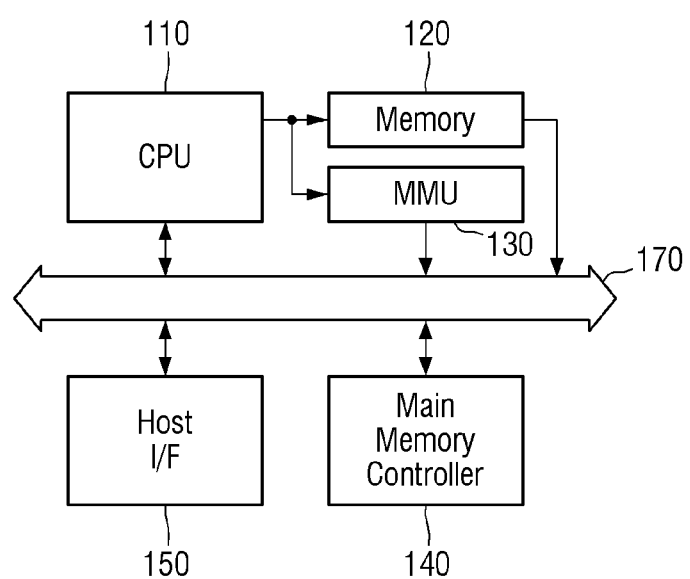
FIG. 2 is a block diagram illustrating the memory controller according to some embodiments of the present inventive concept.

FIG. 2 is a block diagram further illustrating one example of the memory controller 100 according to embodiments of the inventive concept.

Referring to FIG. 2, the memory controller 100 comprises a central processing unit (CPU) 110, a memory 120, a memory management unit (hereinafter, "MMU") 130, a main memory controller 140, a host interface ("host I/F") 150, and a bus 170.

The CPU 110 may be used to execute certain logic and/or arithmetic operations necessary to the functional operation of the memory controller 100. Of note in FIG. 2, the CPU 110 is directly connected (i.e., not using the bus 170) to the memory 120 and MMU 130 via a low-latency interface (i.e., an interface providing performance better than that provided by the bus 170 under similar assumptions). During execution of one or more data access operations, the CPU 110 will select a particular memory bank (hereafter, the "selected memory bank") from among the memory banks of the main memory 300, and then communicate an address to the selected memory bank as well as the memory 120 and memory management unit 130.

In certain embodiments of the inventive concept, the memory 120 may function as a cache memory of sorts, storing data to be processed by the CPU 110 and being directly connected to the CPU 110 in order to efficiently exchange data. Thus, the memory 120 may be considered a low-latency, high bandwidth memory in relation to the memory controller 100. Of note, the memory 120 illustrated in FIG. 2 is configured to enable direct access by the CPU 110 via a "dedicated" interface. This configuration (direct access via a dedicated interface) ensures that the memory 120 operates as an efficient low-level memory with respect to the CPU 110.

The memory 120 may include volatile memory and/or nonvolatile memory. For example, the memory 120 may be a tightly coupled memory (TCM) mounted internal to or closely surrounding the CPU 110 (e.g., a chip including the CPU 110) in order to rapidly access a large data capacity of the main memory 300. In certain embodiments of the inventive concept, the memory 120 may include high speed Synchronous Random Access Memory (SRAM).

The MMU 130 may be used to provide an address to the selected memory bank of the main memory 300. In this regard, the provided address may in certain addressing schemes functionally select the selected memory bank from among the plurality of memory banks included in the main memory 300.

Here, the main memory 300 may be used to internally allocate a received address to multiple memory banks. So, where the MMU 130 receives and stores an address associated with multiple memory banks, the identification of the selected memory bank may further involve designation by the CPU 110. Accordingly, the MMU 130 communicates a stored address to the main memory controller 140 that further controls the operation of the main memory 300. Here, the address provided by the MMU 130 may be communicated (or transmitted) to the main memory controller 140 via the bus 170.

In certain embodiments of the inventive concept, the MMU 130 provides an extended address ("EA") used to select a memory bank. The extended address corresponds to a unique address for each memory bank included in the main memory 300. That is, by allocating each unique address across a plurality of memory banks, it is possible to effectively increase the number of memory banks in the main memory 300 that are controllable by the memory controller 100. It is also possible to increase the storage capacity of the storage device 1000 in this regard.

Like the memory 120, the MMU 130 is a low-latency, high bandwidth component enabling a rapid exchange of data with the CPU 110.

In certain contemporary and comparative memory systems, an analogous MMU would operate under a bank memory expansion control method while being connected to a bus of the memory system. In this configuration the MMU functions as part of a high-level memory providing relatively low bandwidth. Therefore, as previously described, this comparative configuration is susceptible to performance degradation caused by frequent changing of the selected memory bank (i.e., frequent update of an extended address).

In contrast, the MMU 130 of FIG. 2 is directly connected to the CPU 110 via a dedicated interface. Hence, the MMU 130 functions as part of a low-level memory in conjunction with the memory 120. As a result, even if frequent update of an extended address is required by the MMU 130, it is possible to prevent the performance degradation in the storage device 1000.

The main memory controller 140 may be used to exchange commands and data between the memory controller 100 and main memory 300, and may further be used to control the operation of the main memory 300. The main memory controller 140 may receive data from the CPU 110 and an address from the MMU 130 in order to provide same to the memory banks of the main memory 300.

The host I/F 150 may operate using one or more conventionally understood protocols used to communicate at least one of data, address and/or command information (hereafter, singularly or collectively, "data/address/command") from a host to a memory controller. For example, the host I/F 150 may be configured to communicate with the host 400 via at least one of a universal serial bus (USB) protocol, an multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol.

The bus 170 may be used to variously communicate (receive and/or transmit) data/address/command between the CPU 110, memory 120, MMU 130, main memory controller 140, and host I/F 150. For example, the bus 170 may be used to communicate data/address/command provided by the CPU 110 and/or the MMU 130 to the main memory controller 140. In certain embodiments of the inventive concept, the bus 170 may be a multi-layer component (or collection of components) providing signal path(s) among the interconnected components of the memory system 100. In this regard, the bus 170 may operate consistent with one or more protocols conventionally used to exchange data/address/command between the CPU 110, memory 120, MMU 130, main memory controller 140 and/or host I/F 150. In certain embodiments of the inventive concept, the bus 170 may access one or more memory system components using a SoC target on-chip bus protocol. For example, the bus 170 may constitute a multi-layer advanced high-performance bus (AHB) or a multi-layer advanced extensible interface (AXI), etc.

Figure 3:
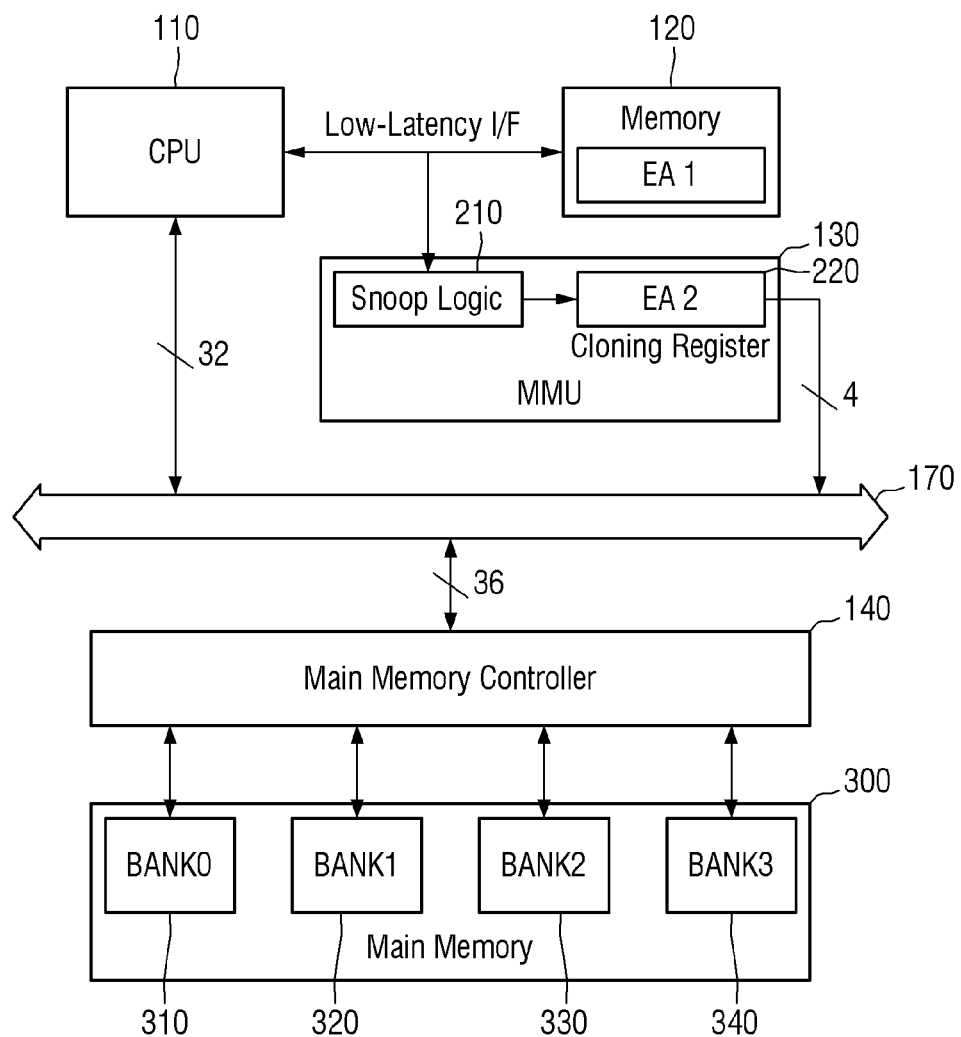
FIG. 3 is a block diagram illustrating the memory controller according to some embodiments of the present inventive concept.

FIG. 3 is a block diagram further illustrating one example of the memory controller 100 of FIGS. 1 and 2 according to some embodiments of the inventive concept.

Referring to FIG. 3, the memory controller 100 again comprises the CPU 110, memory 120 and MMU 130 interconnected as described above using a low-latency interface providing high bandwidth. That is, the CPU 110 may exchange data/address/command with one or both of the memory 120 and MMU 130 without necessarily using the bus 170.

For example, the CPU 110 may be used to temporarily store the data frequently used by the memory 120 via a low-latency interface, and may further be used to store an address of the selected memory bank in the MMU 130.

In certain embodiments of the inventive concept, the memory 120 may include a code memory including firmware capable of storing commands to be processed by the CPU 110 and/or a data memory capable of storing data.

Figure 4:
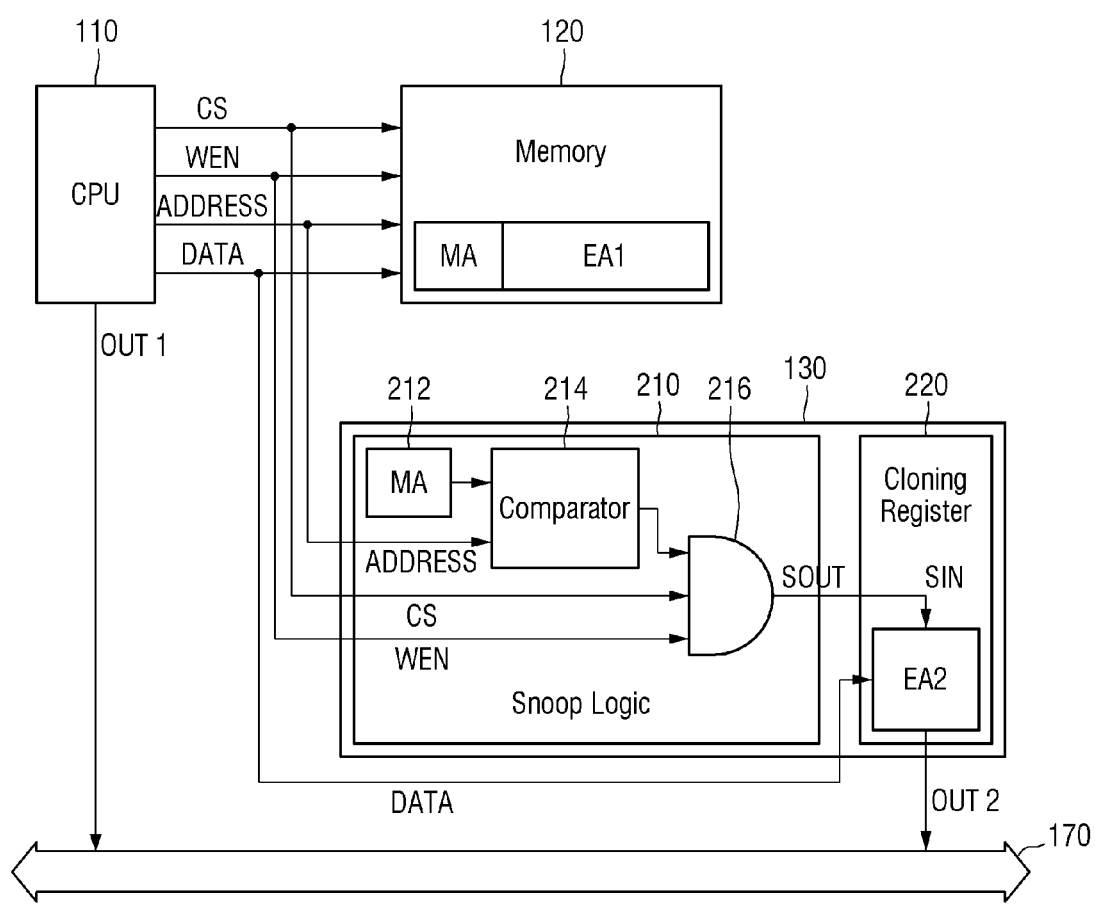
FIG. 4 is a block diagram illustrating constituent elements of a memory management unit (MMU) of the memory controller according to some embodiments of the present inventive concept.

In certain embodiments of the inventive concept such as those illustrated in FIGS. 3 and 4, the memory 120 includes a first extended address (EA1) corresponding to the selected memory bank. The first extended address (EA1) may be stored in the firmware of the memory 120, for example. With this configuration, the memory 120 may access the first extended address (EA1) using a memory address (MA), where memory address (MA) identifies the address storing the first extended address (EA1) in the memory 120. The CPU 110 may access the memory address (MA) of the memory 120 in order to update the first extended address (EA1).

In the illustrated embodiment of FIG. 3, the MMU 130 includes snoop logic 210 and a cloning register 220. With this configuration or its equivalent (software and/or hardware), the MMU 130 may clone (i.e., copy) the first extended address (EA1) and store the cloned first extended address (EA1) in a second extended address (EA2) in the MMU 130, such that the MMU 130 is able, for example, to output the address stored in the second extended address (EA2) in response to a clock or strobe signal.

Accordingly, in one operating approach the snoop logic 210 stores the address (MA) in relation to the first extended address (EA1) of the memory 120, receives a corresponding address (ADDRESS) from the CPU 110 to compare the stored address (MA), and then, as a result of the comparison outputs an update signal (SOUT).

Thus, the snoop logic 210 may be used to determine whether the address (ADDRESS) provided by the CPU 110 is the same as the stored address (MA). If the received address (ADDRESS) is the same as the stored address (MA), the snoop logic 210 may further be used to determine whether to update the address of the selected memory bank (i.e., the memory bank selected by the CPU 110) to the second extended address (EA2), possibly with reference to one or more control signals commonly used in memory systems (e.g., a chip select signal (CS) and/or writing signal (WEN), etc.) and provided (e.g.) by the CPU 110.

In the foregoing example, the cloning register 220 is used to store the cloned first extended address (EA1) in the second extended address (EA2). That is, the cloning register 220 receives update signal (SOUT) from the snoop logic 210 and data (DATA) from the CPU 110. For example, when the update signal (SOUT) is enabled, the cloning register 220 may store the received data (DATA) in the second extended address (EA2). That is, when the value of the first extended address (EA1) is updated, the cloning register 220 may be used to clone and store the value in the second extended address (EA2).

Assuming as an example that the CPU 110 outputs 'L' bit data in response to an applied clock, and the MMU 130 then outputs an 'M' bit address stored in the second extended address (EA2) in response to the applied clock. Where it is determined that the address stored in the second extended address (EA2) is the same as the first extended address (EA1), the address stored in the second extended address (EA2) indicates a memory bank of the main memory 300 to be accessed by the CPU 110.

The L bit data output by the CPU 110 and the M bit address stored by the MMU 130 may be communicated to the main memory controller 140 via the bus 170. For example, the CPU may output 32 bit data, and the MMU 130 may output a 4 bit address. Hence, the main memory controller 140 may receive 36 bit data obtained by adding the output data and the address.

The main memory controller 140 may then be used to extract the address of the selected memory bank from the input data. That is, the main memory controller 140 may extract the address stored in the second extended address (EA2) from the input data, and thereafter access the selected memory bank corresponding to the address from among a plurality of memory banks 310, 320, 330 and 340 included in the main memory 300 of FIG. 3.

As has been previously noted, the bus 170 may be used to communicate data/address/command between the CPU 110, MMU 130, and main memory controller 140. The bus 170 may have a high-latency that is relatively higher than a low-latency interface used between the CPU 110 and memory 120, or between the CPU 110 and the MMU 130.

FIG. 4 is a block diagram further illustrating in one example the memory controller 100 of FIGS. 1, 2 and 3 and in particular the MMU 130 according to some embodiments of the present inventive concept.

Referring to FIG. 4, in the memory controller 100 the CPU 110 is assumed to provide a chip selection signal (CS), a writing signal (WEN), an address (ADDRESS) and data (DATA) to the memory 120 and MMU 130.

Here, the memory 120 may be variously constituted in a discrete or distributed manner including multiple memory areas. Such areas may be controlled (e.g., physically and/or logically divided and accessed) within the memory 120. For example, the memory 120 may include a code memory including firmware storing commands capable of being processed by the CPU 110, and a data memory storing data.

The chip selection signal (CS), as variously provided, may be used to select any one of the plurality of areas in the memory 120. For example, the chip selection signal (CS) may be used to select an area of the memory 120 corresponding to the first extended address (EA1). Thus, when the chip selection signal (CS) is enabled, the memory 120 may update the first extended address (EA1).

The writing signal (WEN) may be used to indicate whether to store the input data (DATA) in the memory 120. For example, when the writing signal (WEN) is enabled, the memory 120 may store the data (DATA) according to the address (ADDRESS) as provided by the CPU 110.

In certain embodiments of the inventive concept, when the chip selection signal (CS) and writing signal (WEN) are enabled and the address (ADDRESS) received from the CPU 110 is the same as the address (MA) in relation to the first extended address (EA1), the first extended address (EA1) will be updated with the data (DATA) received from the CPU 110.

Like the memory 120, the MMU 130 may receive the chip selection signal (CS), writing signal (WEN), address (ADDRESS) and data (DATA) from the CPU 110.

In the illustrated example of FIG. 4, the snoop logic 210 included in the MMU 130 comprises a register 212, a comparator 214 and a gate element 216. The register 212 may be used to store the address (MA) of the memory 120 in which the first extended address (EA1) is stored, and communicate the stored address (MA) to the comparator 214.

The comparator 214 receives the address (MA) from the register 212 and the address (ADDRESS) from the CPU 110 to determine whether the stored address (MA) and received address (ADDRESS) are the same. If the stored address (MA) and the received address (ADDRESS) are the same, the comparator 214 outputs an enabled logic signal, else if the stored address (MA) and the received address (ADDRESS) are not the same, the comparator 214 outputs a disabled logic signal.

The gate element 216 (e.g., a logical AND gate) receives the output of the comparator 214, as well as the chip selection signal (CS) and writing signal (WEN). Thus, when all of the chip selection signal (CS), writing signal (WEN) and output of the comparator 214 are enabled, the gate element 216 will output an enabled update signal (SOUT).

The cloning register 220 receives the update signal (SOUT) from the gate element 216 and the data (DATA) from the CPU 110. If the update signal (SOUT) is enabled, the address stored in the second extended address (EA2) included in the cloning register 220 may be updated with the data (DATA). As a result, the data stored in the second extended address (EA2) may be set to be the same as the first extended address (EA1). In this manner, the MMU 130 snoops the first extended address (EA1) stored in the memory 120, and may be used to clone and update the data as needed.

The cloning register 220 may be used in this manner to store the data stored in the second extended address (EA2) and communicate the data to the main memory controller 140 via the bus 170 (e.g., in response to a clock signal, not shown). The cloning register 220 may include a latch or a flip-flop for holding the data stored in the second extended address (EA2).

As noted previously, the MMU 130 includes a dedicated interface that is directly connected (i.e., allows direct access) to the CPU 110. As a result, the MMU 130 may perform a snoop function that determines whether the first extended address (EA1) stored in the memory 120 should be updated by data at relatively high speed. When the first extended address (EA1) is updated by the data, an operation of cloning and storing the data in the second extended address (EA2), and transmitting the data to the main memory controller 140 through the bus 170 may also be performed at high speed. This approach avoids performance degradation in the storage device 1000 which uses the expanded memory bank—even when a selected memory bank is frequently updated.

Figure 5:
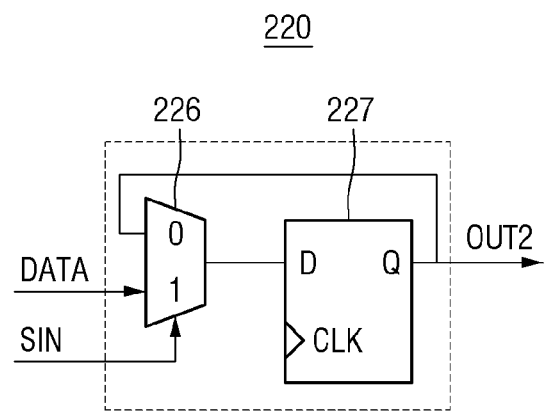
FIG. 5 is a block diagram illustrating a cloning register of the MMU of a memory controller according to some embodiments of the present inventive concept.

FIG. 5 is a block diagram further illustrating one example of the cloning register 220 of the MMU 130 of the memory controller 100 of FIGS. 1, 2, 3 and 4 according to some embodiments of the inventive concept.

Referring to FIG. 5, the cloning register 220 includes a flip-flop configured to store (or hold) applied data. Here, the flip-flop includes a multiplexer 226 and a latch 227.

With this configuration, the multiplexer 226 receives an output value (OUT2) from the latch 227 as the first input value (i.e., via the illustrated feedback signal), and also receives the data (DATA) as the second input value from the CPU 110. The multiplexer 226 selectively outputs the first input value or the second input value in response to the input update signal (SIN). For example, when the input update signal (SIN) is '0', the multiplexer 226 outputs the output value (OUT2) of the latch 227, and when the input update signal (SIN) is '1', the multiplexer 226 outputs the data (DATA) which is input from the central processing unit 110.

Subsequently, the latch 227 operates in response to the clock signal (CLK), and updates the value to the data (DATA) received from the multiplexer 226.

For example, when the input update signal (SIN) is disabled, since the multiplexer 226 outputs the output value of the latch 227 and the latch 227 receives the output value as it is, the value of the data stored in the latch 227 is maintained. In contrast, when the input update signal (SIN) is enabled, the multiplexer 226 outputs the data (DATA) which is input from the central processing unit 110, and the latch 227 updates the value to the input data (DATA).

Figure 6:
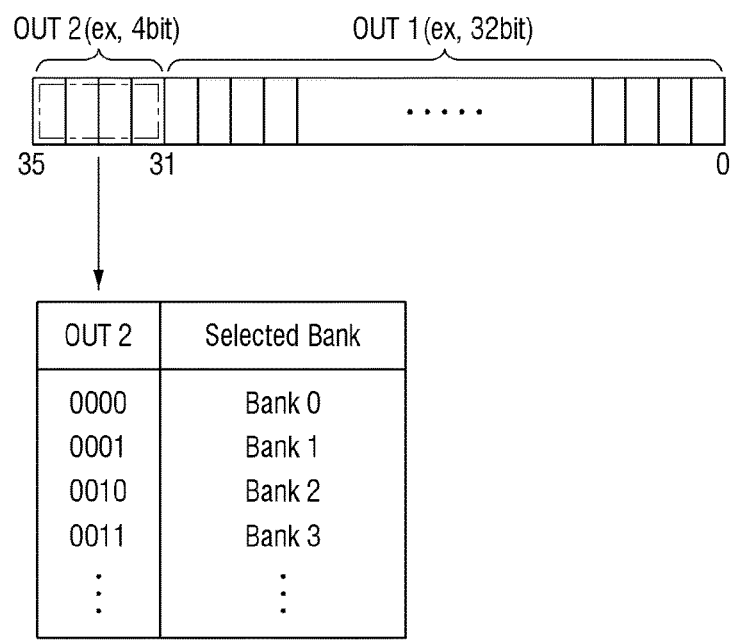
FIG. 6 is a conceptual diagram illustrating a bank selection operation of the MMU included in the memory controller according to some embodiments of the present inventive concept.

FIG. 6 is a conceptual diagram illustrating a bank selection operation executed by the MMU 130 included in the memory controller 100 of FIGS. 1, 2, 3, 4 and 5 according to some embodiments of the present inventive concept.

Referring to FIG. 6, a data set may be obtained by adding the data (OUT1) output from the CPU 110 and the address value (OUT2) output from the MMU 130. The data set may then be communicated to the main memory controller 140, where the main memory controller 140 may then determine the memory bank that needs to be accessed, by extracting the address value (OUT2) indicting a selected memory bank from among the plurality of memory banks.

Extending the example described above, the CPU 110 is assumed to output 32 bit data, and the MMU is assumed to output a 4 bit address in response to a clock signal. The main memory controller 140 receive the resulting 36 bit data.

A unique address value may be allocated to each memory bank of the main memory 300. For example, the address value of '0000' indicates the first memory bank (Bank 0), and the address value of '0001' may indicate the first memory bank (Bank 1).

When the main memory controller 140 receives an N bit address, the main memory controller 140 may theoretically control $2^N$ memory banks. For example, the main memory controller 140 which receives the 4 bit address from the memory management unit 130 may control $2^4$ (16) memory banks.

The size of the address communicated from the MMU 130 may vary with overall memory system design. But as the size of the address increases, the number of memory banks that may be controlled (i.e., uniquely selected) by the main memory controller 140 also increases, and the storage capacity of the main memory 300 may be better accommodated.

Figure 7:
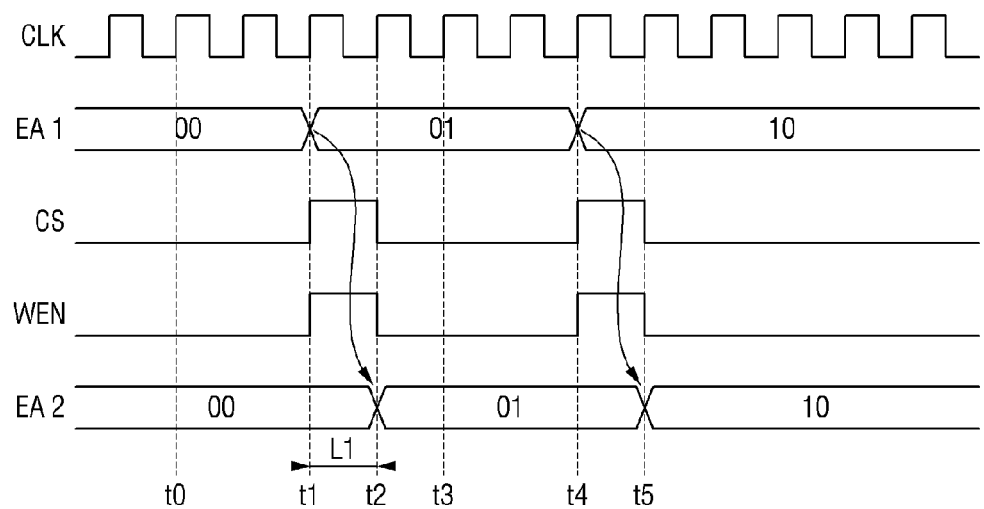
FIG. 7 is a timing diagram illustrating the operation of the memory controller according to some embodiments of the present inventive concept.
Figure 8:
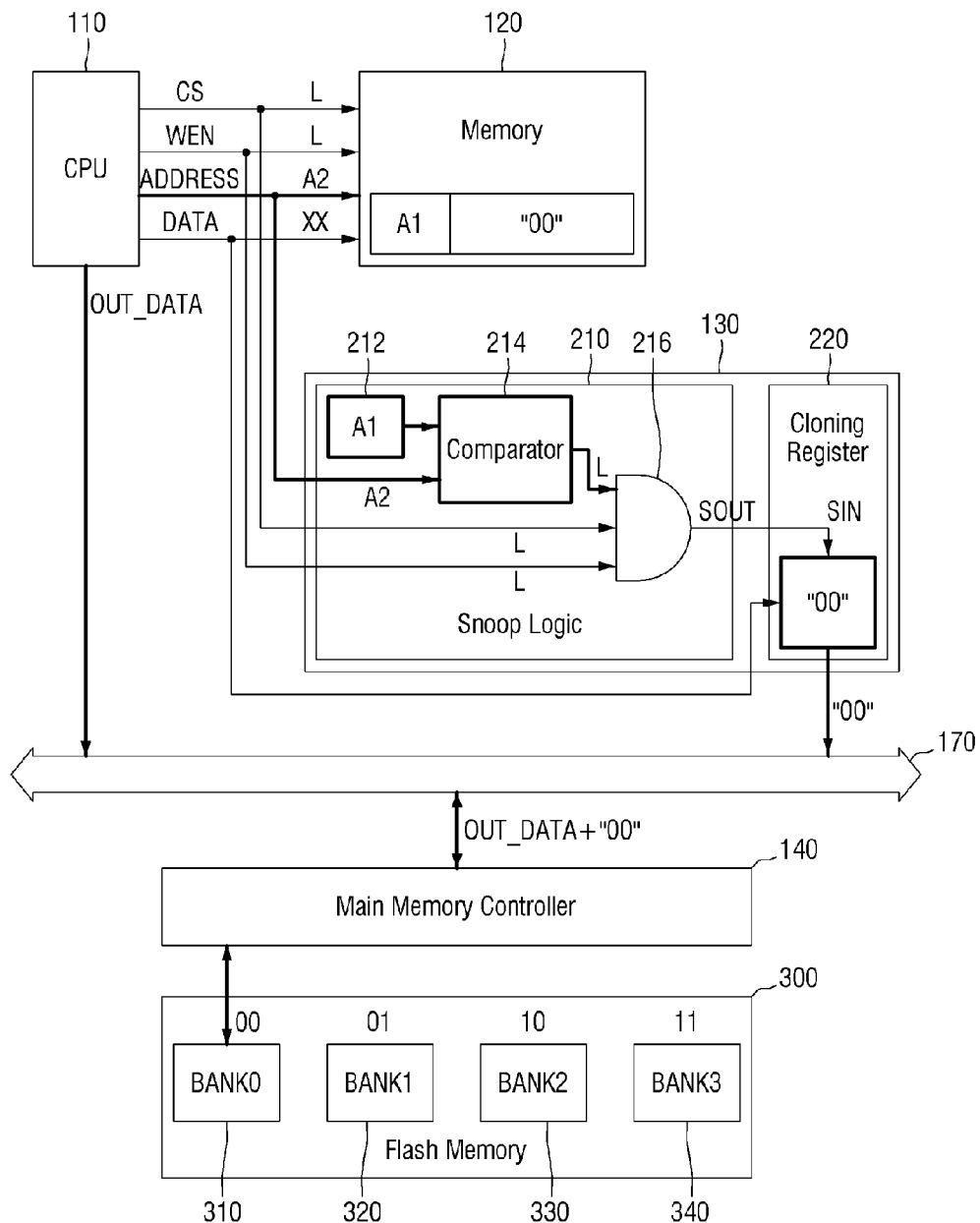
FIGS. 8, 9 and 10 are respective block diagrams further illustrating the operation of the memory controller.
Figure 9:
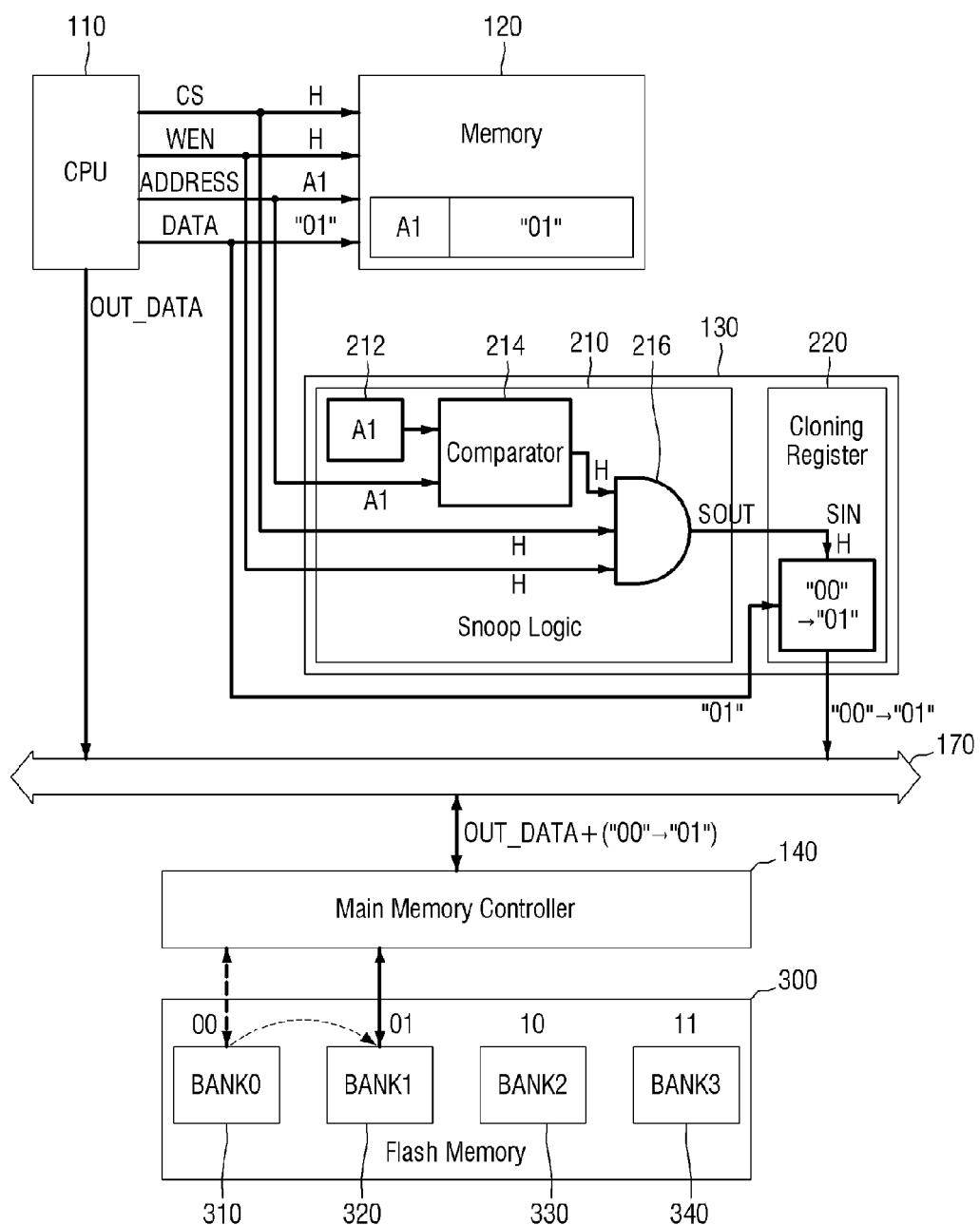
Figure 10:
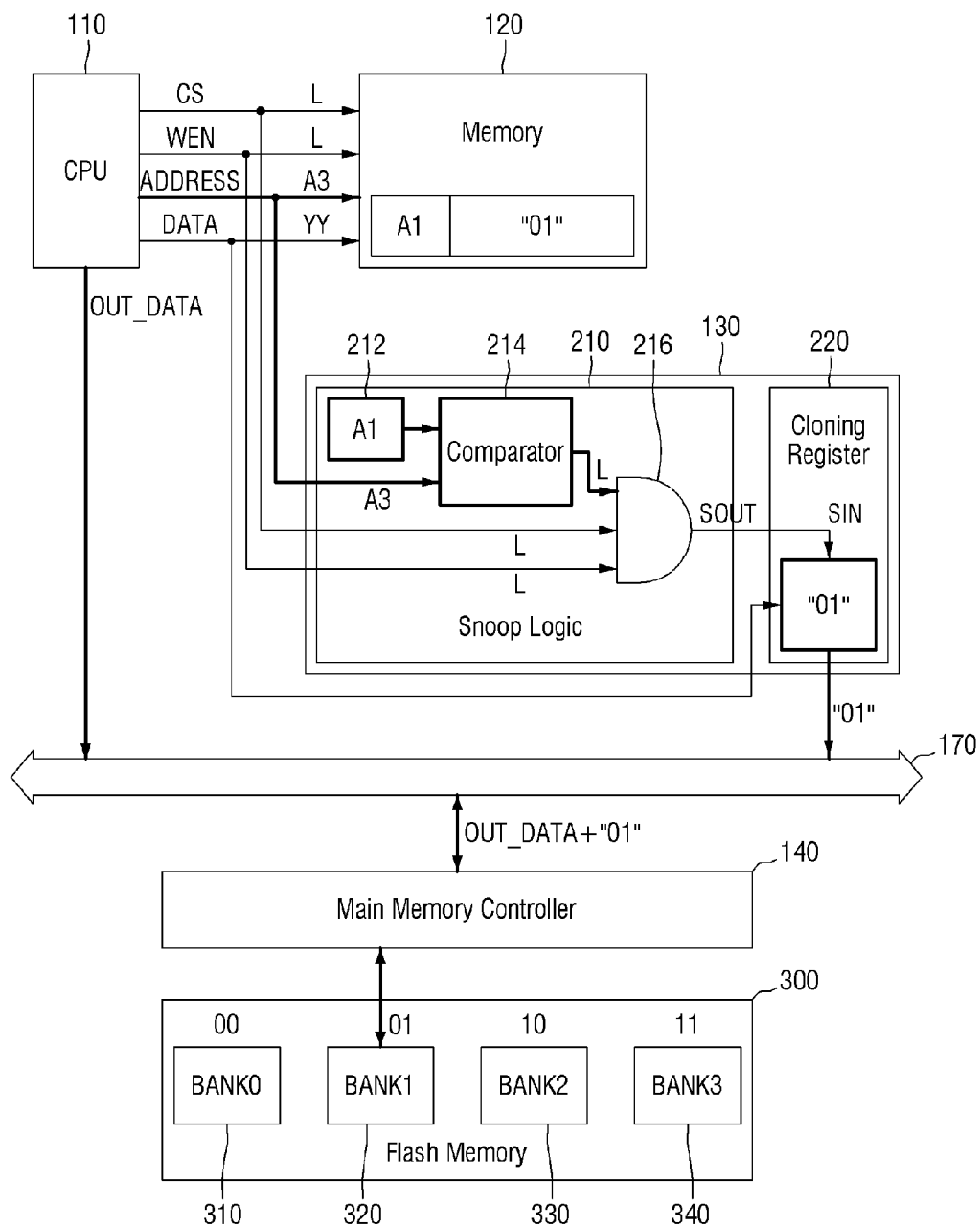

FIG. 7 is a timing diagram further illustrating the operation of the memory controller according to some embodiments of the present inventive concept. FIGS. 8, 9 and 10 are respective block diagrams, comparable to the block diagram of FIG. 4, and further illustrate the operation of the memory controller 100 according to the timing of FIG. 7 and assuming the data set of FIG. 6.

Referring to FIGS. 7 and 8, the chip selection signal (CS) and writing signal (WEN) output by the CPU 110 are assumed to be in a disabled state (L) at t=t0. Therefore, the data (DATA) output from the CPU 110 is not stored in the memory 120.

The address (ADDRESS) output from the CPU 110 is applied to the comparator 214 of the snoop logic 210, and the comparator 214 compares the stored (or first) address (A1) of the memory 120 stored in the register 212 with the received (or second) address (A2) from the CPU 110.

Since the second address (A2) from the CPU 110 at t=t0 and the first address (A1) stored in the register 212 are different, the comparator 214 outputs a disabled signal (L). And since the gate element 216 receives the disabled signal (L), it outputs the update signal (SOUT) of the disabled state (L), irrespective of the chip selection signal (CS) and writing signal (WEN).

The cloning register 220 receives (input) data (XX) from the CPU 110 and the update signal (SOUT) having the disabled state (L) from the snoop logic 210. Therefore, the cloning register 220 does not update the input data (XX) in the second extended address (EA2), and the cloning register 220 outputs the address value ('00') stored in the second extended address (EA2) as is.

The main memory controller 140 receives an output data (OUT_DATA) from the CPU 110 and the address value ('00') from the cloning register 220. The output data (OUT_DATA) and the address ('00') may be simultaneously transmitted to the main memory controller 140. Thereafter, the main memory controller 140 may extract the received address value (e.g., '00') and access the memory bank 310 (BANK 0) of the main memory 300 corresponding to the address value of '00'.

Referring to FIGS. 7 and 9 now, the chip selection signal (CS) and writing signal (WEN) output from the CPU 110 at t=t2 are in the enabled state (H). The first address (A1) output by the CPU is the same as the address (A1) in the memory 120. Therefore, the first extended address (EA1) of the memory 120 is updated with the input data (01') provided by the CPU 110. That is, the address of the selected memory bank, responsive to the CPU 110, is updated.

Therefore, the comparator 214 compares the first address (A1) stored in the register 212 with the address (A1) received from the CPU 110. Since the second address (A1) received from the CPU 110 at t=t2 is the same as the first address (A1) stored in the register 212, the comparator 214 outputs the enabled signal (H). And since the gate element 216 receives the enabled signal (H) from the comparator 214 and the chip selection signal (CS) and writing signal (WEN) are both in the enabled state (H), the gate element 216 outputs the update signal (SOUT) having the enabled state (H).

The cloning register 220 receives the input data ('01') from the CPU 110, and the update signal (SOUT) having the enabled state (H) from the snoop logic 210. The cloning register 220 updates the input data ('01') to the second extended address (EA2). Thereafter, the cloning register 220 outputs the value of the updated address ('00'→'01') stored in the second extended address (EA2).

The main memory controller 140 receives the output data (OUT_DATA) from the CPU 110, and the updated address ('00'→'01') from the cloning register 220. The output data (OUT_DATA) and the updated address (00'→'01') may be simultaneously communicated to the main memory controller 140.

Thereafter, the main memory controller 140 may extract the received address ('01') and begin accessing the memory bank 310 of the main memory 300 corresponding to the updated address ('01').

Referring to FIG. 7, the first extended address (EA1) of the memory 120 is updated at t=t1, and the address stored in the second extended address (EA2) of the MMU is updated at t=t2. Thus, the MMU 130 is able to snoop the first extended address (EA1) of the memory 120, and update the address stored in the second extended address (EA2) after a delay time of L1 (t2−t1). Although the delay time of L1 is expressed as a single clock cycle in the timing diagram of FIG. 7 it may vary with memory system design.

In this manner, embodiments of the inventive concept exhibit relatively low delay in the update of an address used to select a particular memory bank. Thus feature allows embodiments of the inventive concept to operate at a higher speed overall.

Referring now to FIGS. 7 and 10, the chip selection signal (CS) and writing signal (WEN) provided by the CPU 110 at t=t 3 are assumed to transition to a disabled state (L). Therefore, the input data (DATA) provided by the CPU 110 is not stored in the memory 120.

The address (ADDRESS) provided by the CPU 110 is applied to the comparator 214 of the snoop logic 210. The comparator 214 compares the first address (A1) stored in the register 212 with the second address (A3) received from the CPU 110.

Since the second address (A3) at t=t3 is not the same as first address (A1) stored in the register 212, the comparator 214 outputs a disabled signal (L). And since the gate element 216 receives the disabled signal (L), the gate element 216 outputs the update signal (SOUT) of the disabled state (L), irrespective of the chip selection signal (CS) and writing signal (WEN).

The cloning register 220 receives the input data (YY) from the CPU 110, and the update signal (SOUT) having the disabled state (L) from the snoop logic 210. The cloning register 220 does not update the input data (YY) to the second extended address (EA2), and the cloning register 220 continues to output the previous address ('01') stored in the second extended address (EA2).

The main memory controller 140 receives the output data (OUT_DATA) from the CPU 110, and the previous address ('01') from the cloning register 220. The output data (OUT_DATA) and the previous address ('01') may be simultaneously communicated to the main memory controller 140.

The main memory controller 140 may then extract the received address (here, the previous address '01') and continue accessing the second memory bank 320 (BANK 1) of the main memory 300.

Thus, when the memory bank selected by the CPU 110 is updated to the second memory bank (e.g., 320) from the first memory bank (e.g., 310), the memory 120 may update the first extended address (EA1) to the corresponding address ('01') of the second memory bank (e.g., 320), and the MMU 130 may update the address stored in the second extended address (EA2) to be the same as the first extended address (EA1) ('01'). The address value ('01') updated to the second extended address (EA2) and the output value of the central processing unit 110 may be transmitted to the main memory controller 140.

While the present inventive concept has been particularly illustrated and described with reference to exemplary embodiments thereof, it will be understood by those of ordinary skill in the art that various changes in form and detail may be made therein without departing from the scope of the inventive concept as defined by the following claims.

What is claimed is:

1. A memory controller comprising:
   a central processing unit (CPU) that selects a memory bank from among a plurality of memory banks included in a main memory;
   a memory directly connected to the CPU via a low latency interface, wherein the memory stores a first extended address associated with the selected memory bank; and
   a memory management unit (MMU) directly connected to the CPU via a low latency interface, wherein the MMU clones the first extended address and stores the cloned first extended address in a second extended address,
   wherein the MMU comprises
      snoop logic that stores a first address corresponding to the first extended address, receives a second address from the CPU, compares the first address with the second address, and provides an update signal in response to the comparison of the first address and second address, and
      a cloning register that updates address stored in the second extended address with input data received from the CPU in response to the update signal.

2. The memory controller of claim 1, wherein the cloning register updates the address stored in the second extended address when the update signal is enabled.

3. The memory controller of claim 1, wherein the snoop logic comprises:
   a register that stores the first address;
   a comparator that compares the first address stored in the register with the second address; and
   a gate that receives a writing signal from the CPU and an output of the comparator, and outputs the update signal.

4. The memory controller of claim 3, wherein the comparator outputs a disabled signal when the second address is not the same as the first address, and the comparator outputs an enabled signal when the second address is the same as the first address.

5. The memory controller of claim 3, wherein the gate outputs an enabled update signal when both the output of the comparator and the writing signal are enabled.

6. The memory controller of claim 3, wherein the gate further receives a chip select signal from the CPU that selects an area of the memory corresponding to the first extended address, and
   the gate outputs the enabled update signal when the output of the comparator, the writing signal and the chip select signal are enabled.

7. The memory controller of claim 3, wherein the gate comprises an AND gate.

8. The memory controller of claim 1, wherein in response to the CPU changing the selected memory bank from a first memory bank to a second memory bank different from the first memory bank, the memory updates the first extended address and the MMU updates the address stored in the second extended address.

9. The memory controller of claim 1, wherein the cloning register comprises a latch for holding the data stored in the second extended address.

10. The memory controller of claim 1, wherein the memory and the MMU are directly connected to the CPU via the same low latency interface.

11. A memory system comprising:
a main memory including a plurality of memory banks; and
a memory controller that controls operation of the main memory,
wherein the memory controller comprises:
a central processing unit (CPU) that selects a memory bank from among the plurality of memory banks;
a memory directly connected to the CPU via a low latency interface, wherein the memory stores a first extended address associated with the selected memory bank;
a memory management unit (MMU) directly connected to the CPU via a low latency interface, wherein the MMU clones the first extended address and stores the cloned first extended address in a second extended address; and
a main memory controller that accesses the selected memory bank using an address extracted from the second extended address, and
in response to the CPU changing the selected memory bank from a first memory bank to a second memory bank different from the first memory bank, the memory updates the first extended address using an address associated with the second memory bank, and the MMU updates address stored in the second extended address using the address for updating the first extended address.

12. The memory system according to claim 11, wherein the MMU comprises:
a snoop logic that determines whether the first extended address has been updated and whether the address stored in the second extended address has been updated; and
a cloning register that stores the cloned first extended address in the second extended address, and outputs an address extracted from the second extended address.

13. The memory system according to claim 12, wherein the snoop logic comprises:
a register that stores a first address associated with the first extended address,
a comparator that compares the first address stored in the register with a second address received from the CPU, and
a gate that receives a writing signal from the CPU and an output of the comparator, and outputs an update signal.

14. The memory system according to claim 11, further comprising:
a bus that exchanges at least one of data, address and command information between the CPU, the MMU and the main memory controller, wherein data received from the CPU and the address stored in the second extended address received from the MMU are simultaneously communicated to the main memory controller via the bus.

15. The memory system according to claim 14, wherein the main memory controller extracts the address from the second extended address and accesses the selected memory bank corresponding to the extracted address.

16. A method of operating a memory controller accessing data stored in a main memory including a plurality of memory banks and including a central processing unit (CPU), a memory connected to the CPU via a low latency interface, and a memory management unit (MMU) directly connected to the CPU via a low latency interface, the method comprising:
storing in the memory in a first address, a first extended address identifying a selected memory bank among the plurality of memory banks;
cloning the first extended address in the MMU and storing the cloned first extended address in a second extended address in the MMU;
snooping at least one of the first extended address and second extended address upon receiving a second address from the CPU and comparing the first address with the second address;
providing an update signal in response to the comparison of the first address and second address in the MMU; and
updating address stored in the second extended address in a cloning register of the MMU with input data received from the CPU in response to the update signal.

17. The method of claim 16, wherein the snooping of the at least one of the first extended address and the second extended address and the comparing of the first address with the second address comprises:
storing the first address in a register;
comparing the first address stored in the register with the second address to generate a comparator output; and
in response to a writing signal received from the CPU and the comparator output, providing the update signal.

18. The method of claim 17, wherein the comparator output is a disabled signal when the second address is not the same as the first address, and the comparator output is an enabled signal when the second address is the same as the first address.

19. The method of claim 17, wherein the update signal is an enabled update signal when both the comparator output and the writing signal are enabled.

20. The method of claim 17, wherein the snooping of the at least one of the first extended address and the second extended address and the comparing of the first address with the second address further comprises:
receiving a chip select signal from the CPU that selects an area of the memory corresponding to the first extended address, and
the update signal is an enabled update signal when the comparator output, the writing signal and the chip select signal are enabled.

* * * * *